Dec. 29, 1970
B. I. BARTNER
3,551,064
UNITARY COMPOSITE ARTICLE AND METHOD OF
MANUFACTURING THE SAME
Original Filed April 18, 1967
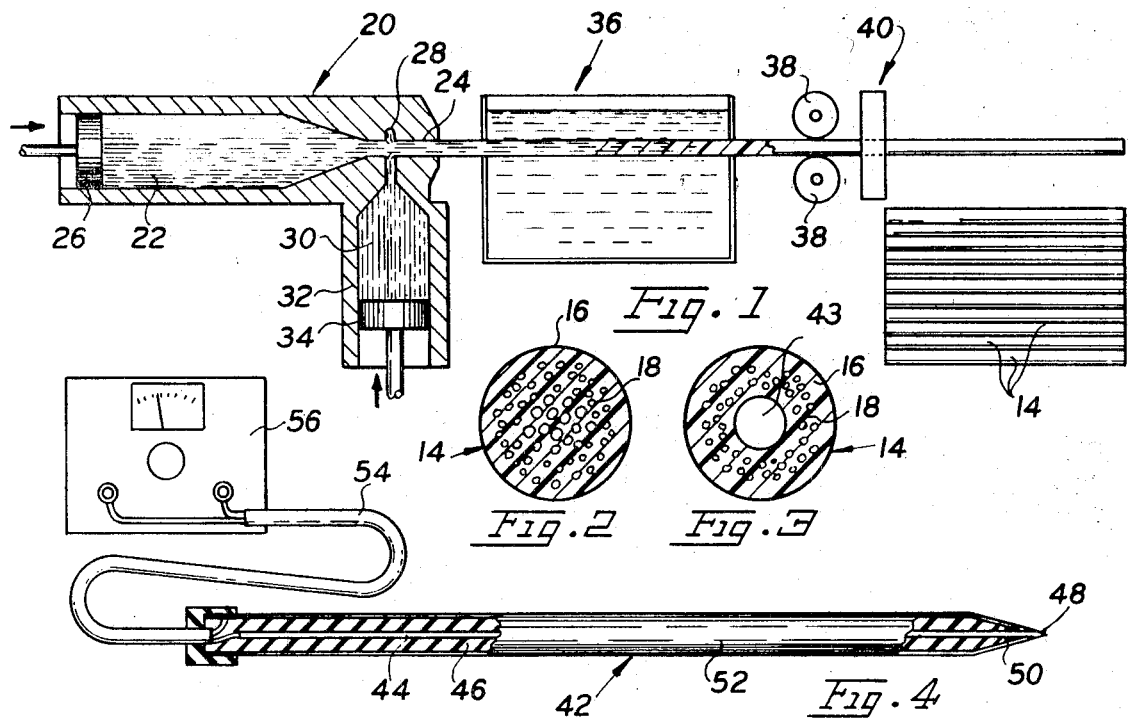
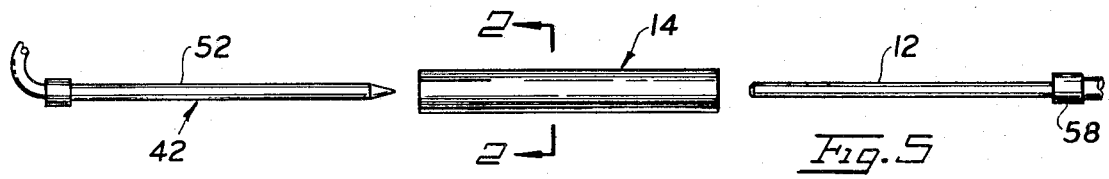
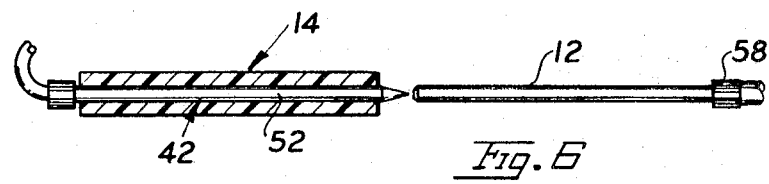
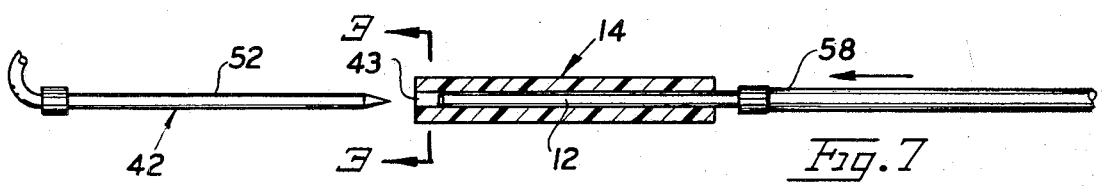
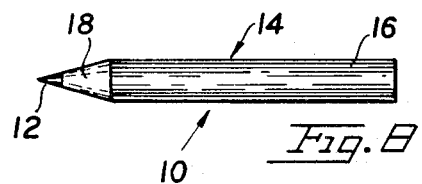
INVENTOR.
BERNARD I. BARTNER
BY
ATTORNEY United States Patent Office 3,551,064
Patented Dec. 29, 1970

3,551,064
UNITARY COMPOSITE ARTICLE AND METHOD
OF MANUFACTURING THE SAME
Bernard I. Bartner, 229—07 58th Ave.,
Bayside, N.Y. 11364
Original application Apr. 18, 1967, Ser. No. 631,652.
Divided and this application Aug. 8, 1969, Ser.
No. 849,933
Int. Cl. B43k 19/02, 19/06
U.S. Cl. 401—96
5 Claims

ABSTRACT OF THE DISCLOSURE

A unitary composite article wherein a body of plastic material has such characteristics as to enable it to be machined like wood and which may be used as a covering body or casing to encompass and enclose a member, such as a "lead" core. The core member and body are permanently and securely bonded together by the direct adherence and of the plastic to the core member encompassed therewithin to render the core and body an inseparable solid, and consequently a unitary composite article.

This invention is a division of United States patent application Ser. No. 631,652, filed Apr. 18, 1967 now abandoned in favor of continuation-in-part application 860,150 filed Sept. 4, 1969, entitled "A Unitary Composite Article and Method of Manufacturing the Same."

BACKGROUND OF THE INVENTION

The present invention relates to unitary composite articles such as writing instruments and the like, and methods of manufacturing such articles.

In the manufacture of a unitary composite article such as a lead pencil, it had been customary to provide a pair of complementary shaped elongated wooden members each of which is formed with a groove for receiving part of a lead core. The lead core is received in the bore formed by the grooves of the pair of elongated wooden members which are thereafter joined to each other by a suitable adhesive or the like, so that in this way lead pencils are conventionally manufactured. As a result of these procedures it is necessary to carry out a multiplicity of steps in order to manufacture lead pencils, undesirably increasing the cost thereof, and because of problems encountered with respect to the joining of the wooden bodies to each other and to the lead core, a reliable bond between these components is not always achieved.

SUMMARY OF THE INVENTION

It is accordingly a primary object of the present invention to provide a unitary composite article and method of manufacturing the same which will avoid the aforementioned problems.

In particular, it is an object of the present invention to provide a unitary composite article such as a writing instrument that may take the form of a crayon pencil or lead pencil which obviates the cumbersome prior art practice of joining separate casing components to each other surrounding the core of the writing instrument and the use of a bonding adhesive therebetween.

In particular, it is an object of the invention to provide a unitary composite article where an inner elongated member is encased within a one-piece exterior casing so that the problems encountered with conventional constructions can be avoided.

Further, it is an object of the present invention to provide a method according to which an elongated member, such as a marking or writing member, as the core of a lead pencil, is introduced into the interior of a one-piece body which encases the core or elongated member while also becoming firmly bonded thereto, so that it becomes possible with the method of the invention to manufacture articles such as writing instruments or the like at a far lower cost than conventional articles of this type while at the same time eliminating the problems encountered with the finished article, such as the reliable holding together or adhesion of the components thereof.

In accordance with the method of the invention an elongated member is introduced to the interior of an elongated body of a foam thermoplastic while the body is in a plastic condition. By the method of the invention, the elongated member directly engages the inner surface of the elongated body so that during subsequent cooling and setting of the body its inner surface becomes securely and permanently bonded with the elongated member, thereby resulting in the unitary composite article. The elongated body of foam thermoplastic can be extruded in a conventional manner and an elongated heated probe may be axially passed through the body of foam plastic for providing it with its heated inner surface which subsequently engages the elongated member. This latter member may be introduced into the plastic body substantially simultaneously with withdrawal of the probe therefrom. In practice, the heated probe has been used to form a bore in the body the dimension of which is determined by the size of the outer surface of the probe. However, it has been found that the body may be initially extruded with a bore of a slightly smaller diameter than the probe so that when the probe is introduced into bore the surface which defines the bore will become heated, softened and plastic. The elongated member itself may have a diameter slightly greater than that of the inner surface of the bore which is in the heated plastic condition, so that this bore becomes expanded slightly during the introduction thereinto of the elongated member and thus forms a secure bond therewith. During its extrusion, the plastic body is provided at its outer surface with a non-foamed plastic at least partially covering the outer surface of the plastic body, so that the rigidity of the body is increased without adversely affecting its machine-ability characteristics. Thus, it becomes possible to machine the resulting unitary composite article in a conventional pencil sharpener.

BRIEF DESCRIPTION OF THE DRAWINGS

The invention is illustrated by way of example in the accompanying drawings which form part of this application and in which:

FIG. 1 is a schematic illustration of one possible manner in which elongated plastic bodies may be formed;

FIG. 2 is a transverse section, taken along line 2—2 of FIG. 5 in the direction of the arrows, of a plastic body extruded with the structure of FIG. 1;

FIG. 3 is a transverse section of the plastic body taken along line 3—3 of FIG. 7, in the direction of the arrows;

FIG. 4 is a schematic side elevation, partly in longitudinal section, of an enlarged heating structure used in the method of the invention;

FIG. 5 illustrates one stage in the manufacture of the article according to the method of the invention;

FIG. 6 shows a stage in the method subsequent to that of FIG 5;

FIG. 7 illustrates a stage in the method of manufacture of the invention subsequent to that of FIG. 6; and FIG. 8 shows, in side elevation, one possible article of the present invention manufactured according to the method of the invention.

DESCRIPTION OF PREFERRED EMBODIMENTS

Referring now to the drawings, and first to FIG. 8, the unitary composite article, generally identified by the numeral 10, is illustrated therein as a lead or a coloring pencil, having a writing core 12 which at one end projects beyond a casing or body 14 which surrounds the core 12. The core 12 thus forms an elongated member capable of making a mark on paper so that the article 10 may be said to be a writing instrument. The casing generally identifed by the numeral 14 encases the elongated core member 12 and has, in the illustrated sample, an outer shell 16 of a relatively rigid non-foamed plastic. This shell 16 of the elongated body 14 surrounds and is integrally extruded with a foam plastic inner lining or portion 18 which extends longitudinally through and for the length of the shell 16. The plastic body 14 is made of any suitable thermoplastic, as referred to in greater detail below. It is a one-piece body which firmly adheres and is permanently bonded at its inner surface to the exterior surface of the elongated member 12, the result of which is an inseparable unitary composite structure.

The cellular structure of the foam plastic inner lining 18 approximate the cellular structure and characteristic of wood, thereby enabling it to be machined with the same ease as wood in a conventional pencil sharpener. If the whole body 14 were of such porous or cellular structure as the inner lining 18, it would be too flexible and therefore it would not sufficiently protect the soft core 12 therewithin. Hence, the added protection of the harder, less porous and more rigid outer shell 16. When this thin outer shell 16 is applied to the inner lining 18 it adds sufficient rigidity to the body that limits flexing or bending of the body that might damage its inner core 12.

In order to manufacture the article 10, in accordance with the method of the invention, the body 14 thereof is extruded in a conventional extruder 20 shown in FIG. 1. This extruder contains the foam plastic mass 22 which is urged outwardly through the extruder outlet 24 in any suitable way, such as by a plunger or piston 26 which is acted upon in a conventional manner. If desired, a screw type of material feeder can be provided for the extruder to urge the plasticized mass 22 out of the latter. This mass 22 is a thermoplastic material which contains a suitable foaming agent so that the resultant extrusion will be composed primarily of a foamed plastic porous in structure and having a multiplicity of cells therein which may be either of the open or closed type.

Positioned about and in the region of the outlet 24, the extruder 20 has an annular chamber 28. The chamber 28 surrounds the outlet opening 24 through which the mass 22 issues and communicates with a mass of non-foamed plastic 30 which is compatible with the material 22 so as to form an integral and indistinguishable body therewith. Because the channel 28 surrounds the outlet 24 through which the extruded mass 22 issues, the material 30 forms the outer shell covering 16 of the body 14. It is this non-foamed plastic coating 16 that gives the cellular foamed body 18 added rigidity. The mass of plasticized non-foamed material 30 is urged out of the chamber 32 by a plunger 34 acted upon in a conventional way, or in this case also a screw-type of material feeder may be used.

If desired, the channel 28 need not form a continuous circle around the bore through which the material 22 issued, and instead it can be interrupted by ribs extending across the channel 28 in the direction of the axis of the outlet 24 through which the material 22 issues. These ribs may be uniformly or non-uniformly distributed about the axis of the channel 28 to interrupt the flow and extrusion of the material 30 about the prior extruded material 22. By controlling the design of the ribbing of the outlet channel 28, it has been found possible to apply reinforcing rigidifying ribs to the extruded material 22 rather than to apply a full and complete shell covering 16. In this way it is also possible to achieve many different types of decorative effects on the outer surface of the body 14.

Thus, it will be recognized that as the foam plastic material 22 is extruded through the outlet 24, its outer cellular surface is almost immediately impregnated with the non-foaming plastic material 30. As the material 30 is extruded, it flows into the porous, cellular structure of the material 22, fusing therewith and becoming indivisible and inseparable therefrom. For all purposes the two materials 22 and 30 become one whole, unitary extruded body. The inner portion or lining 22 becomes the part in the article 10 identified as the lining 18 while, the outer covering 30 is the shell 16.

Upon issuing from the extruder 20, the composite extrusion passes through a cooling bath 36 of any conventional construction, and is transported by means 38, which may be driven in any suitable way, to a cutter unit 40, also of any conventional construction. This unit 40 cuts the extruded rod into bodies 14, of pre-selected lengths, collected in any suitable receptacle, as schematically indicated at the lower right portion of FIG. 1. The extruded bodies will have in cross-section the construction indicated in FIG. 2 which illustrates the inner cellular body 18 of foam thermoplastic surrounded by the indivisibly and integrally fused outer shell 16 of non-foamed plastic that is polymerized therewith.

After each body 14 is formed it is worked upon by a heated probe 42 indicated in FIG. 4. This probe may take the form, for example, of a nichrome wire 44 encased within a suitable casing 46 with an end 48 of the wire 44 exposed and electrically joined, as by silver solder 50 to an outer stainless steel casing 52. This casing 52 and the wire 44 are electrically connected with a pair of conductors of a lead 54 joined to any power source 56, so that when the latter is energized the probe 42 will be heated.

Referring now to FIG. 5, the body 14 and the probe 42 are initially situated at opposite ends of the body 14 and with respect to each other substantially in the manner shown in FIG. 5. While the body 14 is held in any suitable holding structure (not shown), the heated probe 42 is guided into and through the body 14 so that the outer shell 52 of the probe, which is at an elevated temperature, pierces at its leading pointed end the body 14 to produce or form an axial hollow or bore therein. During the time the probe 42 pierces through the body 14 to form the latter with an axial bore, the elongated member 12, in the form of a lead core in the illustrated example, is maintained in readiness on any suitable support to be pushed into the body 14 at its opposite end.

In the event the body 14 is extruded as a solid rod, as shown in cross-section in FIG. 2, it will be necessary to form the same by the probe 42 with a central axial bore 43 therethrough to enable it to subsequently receive the member 12 therein. On the other hand, it has been found convenient to initially extrude the body 14 with a central hollow or axial bore 43 as in FIG. 3. If the bore 43 is initially extruded therein, its size will be smaller than that of the heated probe 42 which, in turn, is smaller than that of the insert 12. Thus, while the body 14 is held in any suitable holder (not shown) the heated probe 42 will enter the bore 43 to be guided thereby to penetrate the length of the body. As the heated probe 42 quickly penetrates the length of the bore 43 or forms the same, the cellular lining 18 breaks down and melts rapidly under its heat, thereby enlarging the bore size. Hence, it is important that the operation of the probe be performed rapidly. Its insertion into and removal from the body 14 should be no longer than is necessary to form the bore 43 of the size opening that is just sufficient to accomodate the receipt of the insert member 12 therein. If the probe 42 remains in the body too long, its heat will form an increasingly larger bore by causing the adjacent cellular structure of the lining 18 to melt and break down. Thus, to facilitate the rapid and also accurate insertion of the probe 42 into the body, it is convenient if the body is initially extruded with the bore 43.

Consequently, it will be clear that the heated probe 42 will form the central bore 43 if none previously existed, or if one was there initially, it will enlarge the same. The longer it remains in the bore 43, more cells of the foam lining will be melted and therefore the larger will be the resultant bore 43. For this reason, it is a good practice to attempt to insert the core 12 into the body bore 43 almost simultaneously or as soon as possible after the removal of the probe 42 after it has reached its end position of FIG. 6. Therefore, substantially simultaneously with the removal of the probe 42 from the bore 43, and while the inner surface of the bore is still in its molten state, the core 12 is forced thereinto as shown in FIG. 7. This may be accomplished by the use of any desired pusher structure 58.

As the core 12 is forced into the bore 43 formed by the probe 42, it disturbs the molten cellular structure of the foam plastic in which the bore exists. This results in surface to surface contact and engagement between the outer surface of the core 12 and the bordering cells of the bore 43. If the insertion of the core 12 is performed while the foam thermoplastic is in its heated plastic condition, the engaging cellular surfaces of the bore adheres and becomes securely and permanently bonded to the core 12 as the thermoplastic hardens and sets. Furthermore, if the plastic is sufficiently molten when the core is inserted, the plastic will flow into whatever cells, pores or crevices may be present in the core so as to form a locking bond therewith. The resultant structure is a core so permanently bonded to the interior of the body that they form a unitary combined article.

While the above described method and article of the invention refer to a lead pencil, the invention is applicable to many other types of articles. Many different types of elongated members can be encased within a body 14 according to the method of the invention. For example, instead of black lead, the elongated core member 12 may take the form of crayon of any desired color. The elongated member 12 may also form a ball-point pen filler which is enclosed at its exterior surface within the plastic body and with the writing end of the pen projecting beyond the plastic body.

During the practice of the invention it has been found that instead of using a heated probe 42, it is possible to heat the elongated core member 12 just prior to insertion thereof into the body 14, so that this core member 12 itself will form its own conforming bore. In the case where the body 14 is extruded with a preformed axial bore insert 43, it will serve as a guide for the rapid insertion of the heated core 12 thereby assuring its exact central location within the body 14. During such insertion the heated core member 12 will reduce the heated adjacent cells of the foam thermoplastic material to a molten condition. As the heat dissipates the plastic hardens and firmly adheres and bonds to the surrounded wall of the core member.

As has been indicated above, the body 14 is composed primarily of a foam thermoplastic material. As a result, when the inner surface of the body is heated and placed in a plastic condition cells of the body break and flow so that the material of the body 14 spreads and flows along the exterior surface of the elongated member 12. During heating and setting of the body 14 at its inner surface it forms with the exterior surface of the member 12 a bond which has proved to be of the greatest strength, a highly intimate and secure connection being provided in this way. It is to be noted that in dealing with a lead core 12, in particular, because of the slippery, somewhat greasy nature of this lead core, problems have been encountered in the prior art in joining the half casings of a wood pencil to such lead cores, whereas with the structure of this invention, without the use of any adhesive, solvent, or the like, the inner surface of the body 14 directly adheres and permanently bonds to the exterior surface of the member 12, forming an exceedingly secure connection therewith in a very simple way.

The foaming of the plastic body 14 is achieved by the use of a foaming agent, as is well known in the art. In accordance with a further feature of the invention, this foaming agent may be activiated when the inner surface of the bore 43 of the body 14 is heated and engages the exterior surface of the member 12. As a result of the heat derived from the heated inner surface of the bore 43 of the plastic body, the foaming agent continues to function and tends to expand the cells of the body inward toward the core 12 so that not only does it press the plastic cells into tighter frictional engagement and connection with the member 12, but it mechanically grips and squeezes the member 12, thus increasing the security of the adhesion and bond of the connection.

The body 14 has been made of numerous thermoplastics. Thus, polystyrene with a suitable foaming agent has been successfully used for the inner foam portion 18 of the body 14 while non-foamed polystyrene is used for the outer shell 16, although any other compatible plastic which is not foamed could also be used for this purpose. In addition, polypropylene has been used with a suitable foaming agent for the interior portion 18 of the body 10, while non-foamed polypropylene is used for the outer shell 16. Other thermoplastics such a rigid polyvinyl chloride and polyethylene can be used in a similar way for the body 10.

The density of the thermoplastic used for the foamed portion 18 of the body 10 can be varied. In the case of polystyrene, it has been found that this density may range from the neighborhood of 6 pounds per cubic foot up to approximately 16 pounds per cubic foot. The particular choice will depend on the results which are to be achieved. For example, solid polystyrene is far too brittle to be machined in a conventional pencil sharpener and will tend to shatter, creating considerable difficulties in the sharpening. However, at relatively low densities, lower than approximately 6 pounds per cubic foot the foamed inner portion of the body 10 becomes much too flexible, while at densities greater than 16 pounds per cubic foot it becomes too tough. By reason of the outer shell 16, or at least by reason of partially covering the foam portion with an outer portion of non-foamed plastic, it is possible to provide a very easily machinable body, capable of being handled without any difficulty whatsoever in a conventional pencil sharpener, at the same time providing the body with the required rigidity. The same considerations will of course apply to any thermoplastic, and depending upon the desired properties of the final unitary composite article, it is possible to choose suitable densities and a suitable extent of foaming.

One of the advantages achieved by using the foam form of body 10 is that the thermoplastic material can be used to a far greater extent for a greater number of articles because of the lesser amount of the thermoplastic used for any one article. Furthermore, when using foam plastics there are limitations on the coloring which may be provided for the article, since it is difficult to obtain dark shades for foam plastics. Also, the feel of the article is not as comfortable as the tactile qualities of a solid non-foamed plastic. Thus, by providing an outer shell 16, or at least a partial exterior covering of a non-foamed plastic, it becomes possible to produce an article which is more comfortable to handle and which can be provided in a far easier manner with any desired coloration, or even with any desired printed matter, advertising matter, or the like.

Thus, with the method of the invention it is possible to produce unitary combined articles of the invention which have a very pleasing exterior appearance and which are pleasant to handle while at the same time, in the case of lead pencils, being easy to machine. The coloration can take many different forms, including swirls of different colors and when using elongated striations of solid non-foamed plastic at the exterior of the body, extending longitudinally thereof, leaving portions of the foam plastic uncovered, particularly pleasing effects have been achieved. One of the further advantages which is derived from the use of an outer non-foamed plastic is that the tendency of the foamed plastic to have an exterior surface which is formed with longitudinal scratches or grooves as it issues from the extruder is avoided because the non-foamed plastic gives to the exterior of the article a smooth outer surface which is free of such defects. The use of the outer, harder shell 16 of non-foamed plastic limits the extent to which the body 10 can be bent, so that in this way the inner core member 12 is protected. Without an outer, at least partial, covering of non-foamed plastic, the flexible foam will permit easy bending of the article, which may be desirable in some uses but will result in breaking a brittle core 12 when the latter takes the form of the lead of a lead pencil.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A unitary composite article comprising a body and a member therein,
said body having inner and outer linings,
said inner lining being of a foam plastic material and having a surface of cellular structure containing a foaming agent that expands when heated,
said outer lining being of a non-foam plastic material,
said member and cellular surface each being discrete,
said member being positioned in said inner lining and having a surface being frictionally engaged by the expansion of said cellular surface,
and said cellular surface being bonded directly to said member surface at the frictional engagement therebetween to engage and to bond said discrete body and member unitarily together.

2. In a writing instrument
an elongated body having an inner lining of foamed thermoplastic material and an outer non-foamed surface of plastic material formed unitary with said inner lining of the machining characteristics of wood,
and a writing member having an elongated outer surface encased in tight engagement along at least a portion of its length by said body inner lining,
said body and writing member being discrete,
said writing member being unitarily joined with said body along its encased length by the adhesive engagement of the foamed thermoplastic material directly with the encased outer surface of the writing member and by the expanded tight engagement.

3. In a writing instrument as in claim 2,
said lining being of a foam thermoplastic having an inner surface of cellular structure that is in direct engagement with said encased outer surface of said writing member,
and said inner cellular surface being bonded to said encased outer surface of said writing member.

4. In a writing instrument as in claim 3,
and the outer non-foamed surface being an outer lining of non-foam plastic on at least portions of the foam lining.

5. In a writing instrument as in claim 2,
said body inner lining being defined along the interior of said body and including a foaming agent expanded inward into tighter encasing engagement with the outer surface of said writing member.

References Cited

UNITED STATES PATENTS

| 1,937,104 | 11/1933 | Thomsen | 401—96X |
| 2,960,967 | 11/1960 | Bauserman | 401—96 |

FOREIGN PATENTS

| 969,976 | 6/1950 | France | 401—96 |
| 62,252 | 5/1955 | France | 401—96 |
| 579,860 | 7/1958 | Italy | 401—96 |

LAWRENCE CHARLES, Primary Examiner

U.S. Cl. X.R.

156—294